June 3, 1924.                                                1,496,631
G. W. HENRY
DEVICE FOR DEVELOPING PHOTOGRAPHIC FILMS
Filed May 17, 1922        3 Sheets-Sheet 2
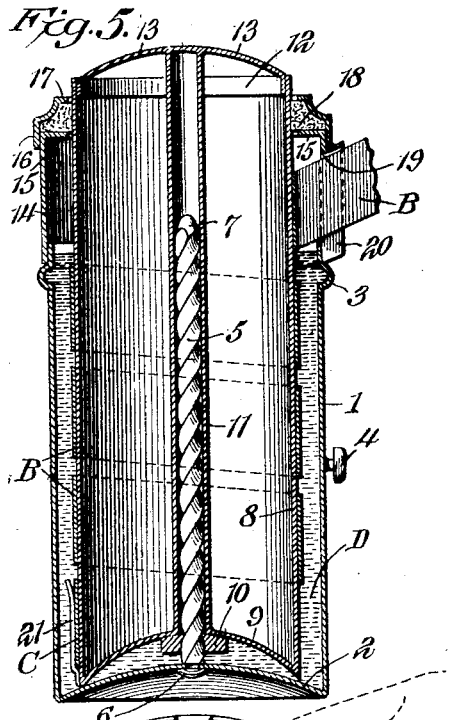
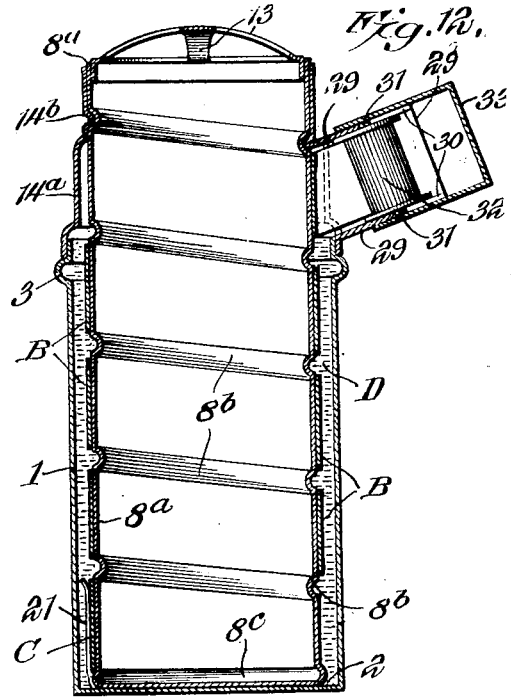
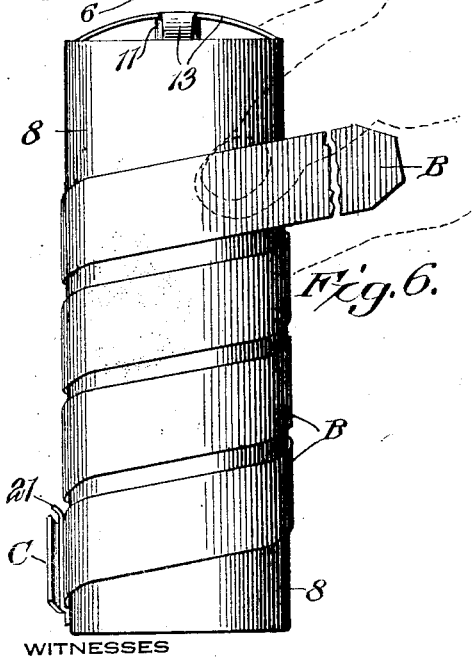
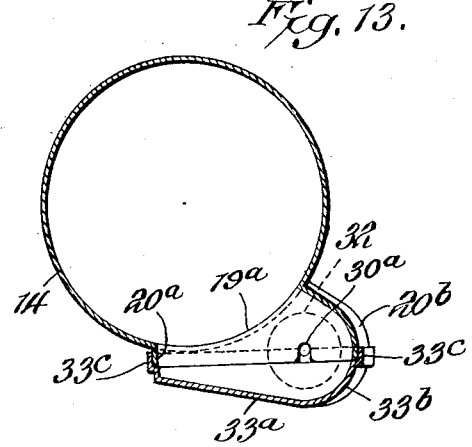
WITNESSES
Bessy R. Latimer
Howard D. Orr
George W. Henry, INVENTOR
BY  E. G. Siggers
ATTORNEY

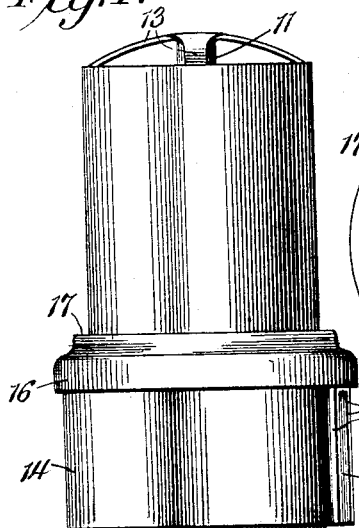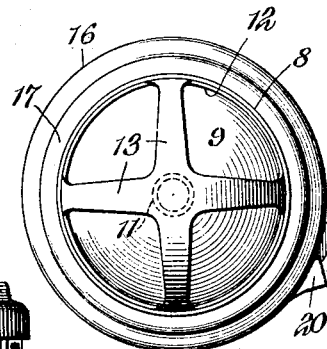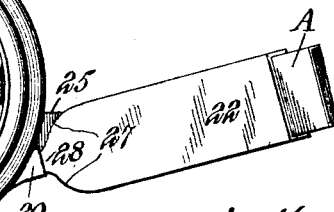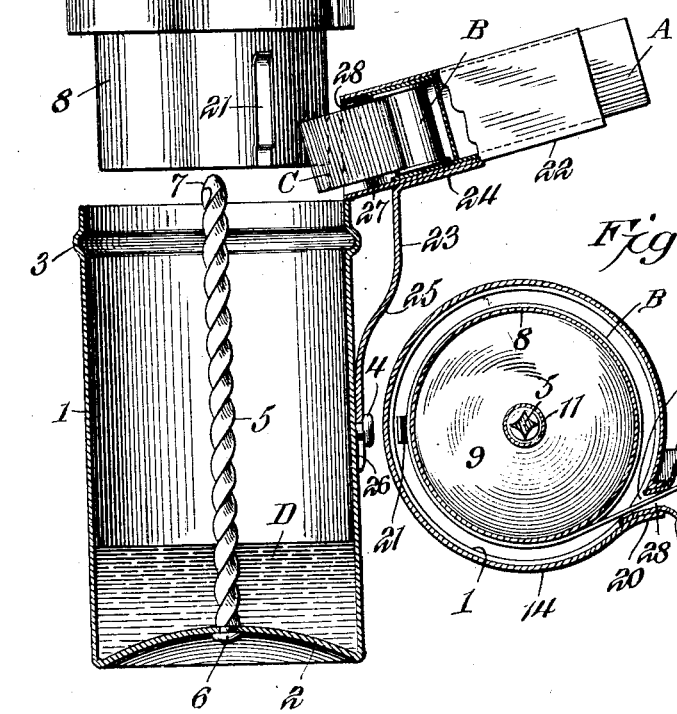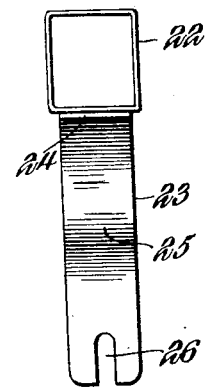

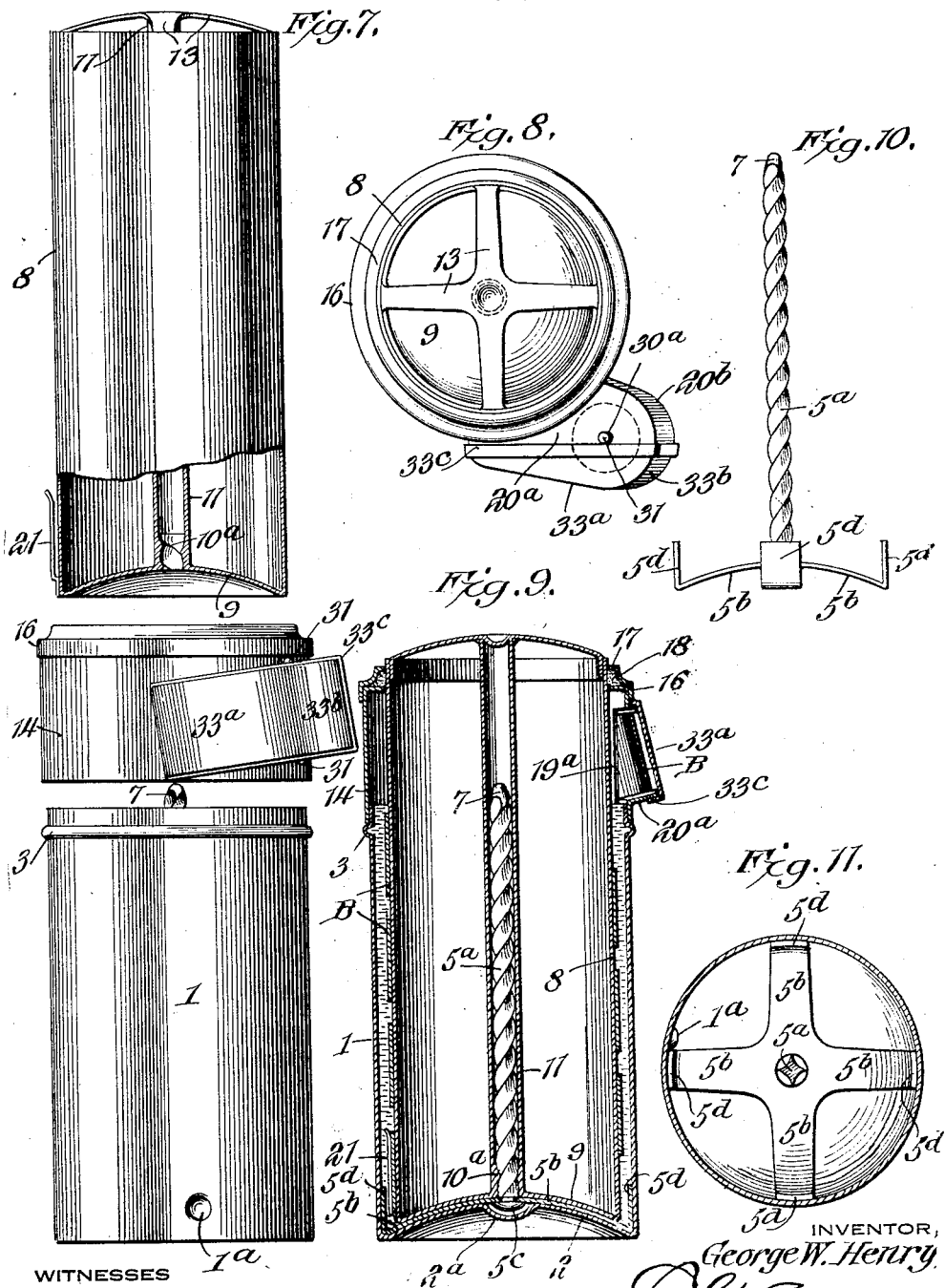

Patented June 3, 1924.

1,496,631

UNITED STATES PATENT OFFICE.

GEORGE W. HENRY, OF BROOKLYN, NEW YORK.

DEVICE FOR DEVELOPING PHOTOGRAPHIC FILMS.

Application filed May 17, 1922. Serial No. 561,664.

*To all whom it may concern:*

Be it known that I, GEORGE W. HENRY, a citizen of the United States, residing at Brooklyn, in the county of Kings and State of New York, have invented new and useful Improvements in Devices for Developing Photographic Films, of which the following is a specification.

This invention relates to a device for developing photographic films.

The object is to provide a device into which a strip or roll of exposed film may be introduced for developing the same, without the necessity of repairing to a dark room, the said device having means whereby the continuous strip of film may be unwound from its carrying spool and wound in spiral fashion onto a cylinder or drum while being submerged in the container having the developing fluid, the latter being displaced and caused to rise around the drum, so that the entire film strip is subjected to the action of said fluid.

Another object is to provide a device of this character which permits of the ready introduction of the rolled film therein, and of easily and quickly connecting the free, blank or non-sensitized end of the film strip to an interior, revolving film stretching cylinder to be uniformly wrapped, in spiral fashion, around the latter while under the chemical action of the fluid, all light being excluded from the unwound film during the operation, the device being thus capable of use while in the open or in the daylight.

A further object is to provide a developing device for photographic films which, after the film has been wound therein and subjected to the developing fluid for the necessary length of time, may be readily removed from the device without any danger of injuring the film or spilling any of the said fluid, the film to be subsequently "fixed" in a suitable bath and dried in the usual manner.

A full and complete understanding of the invention may be obtained from a consideration of the following detailed description, taken in connection with the accompanying drawings, forming a part of this specification, it being understood that while the drawings show practical forms of the invention, the latter is not confined to strict conformity therewith, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a displayed view of one form of the device, partly in side elevation and partly in vertical section, the parts being separated and showing the positions thereof when the operation of developing a film begins.

Figure 2 is a plan view of the device.

Figure 3 is a horizontal sectional view through the same.

Figure 4 is a detail front elevation of the film cartridge box or holder.

Figure 5 is a vertical sectional view of the device and illustrating the positions of the parts during the process of developing a film strip.

Figure 6 is a side elevation of the film-winding or stretching cylinder having the strip of film spirally wound thereon and removed from the outer member or fluid container, after the said film has been properly developed.

Figure 7 is a displayed view in side elevation, partly broken away, of another form, which is deemed to be the preferred form of the device.

Figure 8 is a top plan view of this form assembled.

Figure 9 is a vertical sectional view of the same form, with the parts in assembled relation.

Figure 10 is a detail elevation of the removable actuating screw and supporting base or spider therefor, removed from the tank or container.

Figure 11 is a horizontal sectional view of the container with the screw and spider placed therein.

Figure 12 is a vertical sectional view, similar to Figures 5 and 9, of a third form of the invention and employing a modified spool holder.

Figure 13 is a detail horizontal section through the slidable closure sleeve of Figures 7, 8 and 9, a different form of film spool holder being employed in this form.

Most modern cameras employ a film strip containing a plurality of predetermined spaces or lengths, each being known as a film, and to be properly positioned by means within the camera for exposure through the lens to the object to be photographed. It is very difficult to handle such film strips, after all the exposures have been made, in order to develop and fix the same, and the expense of having such work done by professionals is considerable. A successful device for accomplishing these results has been sought especially by amateurs, and attempts have heretofore been made to provide such a device which could be used in the open or daylight but without entire success.

The present invention has been designed with this object in view, whereby a cylinder having a relatively small quantity of developing fluid contained therein, and carrying a film holder at its upper, open end, arranged at one side and tangentially with relation to the same, is adapted to receive the lower end of a film-winding drum or cylinder, after the latter has secured to it the free, non-sensitized end of the roll of film within the holder, and to hold and guide the drum as it is caused to be lowered into the said container with a spiral motion, while uniformly wrapping or winding the film on the drum and displacing the fluid at the bottom to cause the latter to rise to the upper end of the film, at the completion of the winding thereof, thus subjecting all portions of the film strip to the action of the fluid as the winding drum rests upon the bottom of the container, means being also provided for preventing any ingress of light into the upper end of the container during the operation and also preventing any leakage of the fluid therefrom.

Referring to Figures 1 to 6 of the drawing, there is shown a cylindrical body member or fluid container 1, formed of some suitable, non-corrosive metal, round in cross section and having a bottom 2, preferably formed integrally therewith and concave on its under side to provide an annular bearing surface, so as to more effectually avoid accidental upsetting of the same. Adjacent to its upper, open end, the cylinder or container 1 is provided with an outstanding, annular bead 3, for a purpose to be explained, and a headed stud 4 is suitably secured at one side of the cylinder at a point substantially midway between the bead 3 and the bottom 2.

A threaded post 5 centrally located within the cylinder and arranged longitudinally of the same, is secured at its lower end to the bottom 2, as by riveting over the end of the same, as indicated at 6, and the upper end 7 of the said post projects slightly above the upper end of the cylinder and is tapered, as shown, for a purpose to be explained. The threaded post is advantageously made by giving the proper twisting motion to a rod of suitable metal, square in cross section, thus providing four separate threads of quick pitch which function easily and smoothly. Any other method of forming the post may, however, be employed.

Adapted to be projected into this container is a cylindrical film-winding drum 8, formed of similar metal and somewhat less in diameter than the said container, so that sufficient space is provided between the two when so projected, for receiving the film and a sufficient quantity of the fluid to develop the same, as will become apparent. The winding drum 8 is considerably greater in length than the container 1, and has its lower end closed, preferably by an integral bottom 9 of concavo-convex form as is the aforesaid bottom 2, this form of bottom providing ample space for the reception of a threaded nut 10, suitably secured to the under side of the bottom 9 and at the center of the same, in position to engage with the threaded post 5, the said nut being suitably threaded to coact therewith. The bottom 9 is provided with a central opening in registering relation with the opening of the nut 10 at the center of the same, and the lower end of a tube 11 is soldered or otherwise secured to the upper face of the bottom 9 in surrounding relation to said opening, said tube having an internal diameter to receive and to freely slide over the threads of the post 5.

The upper end of the winding drum is normally open, and has secured within the same an annular ring or flange 12 carrying integrally formed, crossed arms 13 to provide thumb and finger holds for the operator to turn the winding drum into the container, the upper end of the tube 11 being centrally secured to the under face of the crossed arms 13, as clearly shown in Figure 5.

Carried by the winding drum 8 is a closure sleeve 14, open at each end, and having an internal diameter to snugly fit over the upper end of the container 1 and to rest upon the annular bead 3 when the device is in operation. The closure sleeve 14 is provided, at the upper end, with an inwardly directed, horizontally disposed flange 15, through which the winding drum is adapted to freely move in a spiral manner either upwardly or downwardly, and said sleeve has soldered or otherwise secured at its upper end a ring 16 having an annular channel and terminating in an inwardly directed flange 17, in spaced relation to and above the first-named flange 15, and having a similarly sized opening for the passage of the winding drum. A ring 18 of felt or other packing is held between the two flanges 15 and 17 respectively, and is adapted to snugly fit the outer wall of the drum and to exclude any light from entering into the sleeve or container, the slip connection between the latter two members being sufficiently tight to prevent any leakage of the light at this point.

A vertical slot 19 is formed in the sleeve 14 and extends from the lower end thereof upwardly to the lower edge of the surrounding ring 16, said slot being flanked by outstanding flanges 20 located at each side and at the top of the slot, the side flanges 20 being arranged tangentially to the sleeve 14 as clearly shown in Figures 2 and 3 of the drawings. The sleeve 14 is adapted to freely slide up and down upon the winding drum, while at the same time the packing ring 18 will prevent the passage of light between the two members, and the sleeve is prevented from passing off of the lower end of the drum by a film clip 21 secured to the lower end of the drum, the said clip being formed of a strip of spring metal bent to form a foot portion for soldering or otherwise securing the same to the drum, and spaced slightly therefrom to provide space for the end of the film and to clamp the same to the side of the drum, the upper end of the clip being slightly bent outwardly to facilitate the introduction of the said film therein, as will be clearly understood.

In the form of the invention shown in Figures 1 to 6, inclusive, the device is equipped with a film holder in the form of a removable rectangular box or sleeve 22, open at each end and adapted to be supported in an angular position with relation to the side of the drum. This box or sleeve 22 is supported in such inclined position by a downwardly extending, flat metal arm 23, having its upper end bent at an angle, as at 24, and secured to the under side of the box or sleeve 22 and having a curved intermediate portion 25 terminating in a vertically disposed foot portion having a slot 26 extending up a short distance from its lower end, the said slot being adapted to fit over the shank of the aforesaid headed stud 4 and to bear against the head thereof to support the box or sleeve in proper position and to permit of the ready removal of the same.

The metal comprising the sides of the box or sleeve 22, at the end adjacent to the wall of the drum, is brought together as indicated at 27 to provide a centrally located spout 28 having the free edges thereof flared slightly outward and adapted to be sprung together to introduce the same between the tangentially arranged, outstanding flanges 20 surrounding the aforesaid slot 19 in the lower end of the slidable sleeve or closure 14. When thus applied, with the slotted lower end of the supporting arm 23 in engagement with the stud 4, it will be observed that the longitudinal axis of the sleeve or box 22 constituting the film holder is tangentially disposed and substantially in a line with the adjacent face of the winding drum, by reference to Figure 3 of the drawing.

This form of film holder is adapted to receive a film-roll carrier such as is used in certain cameras to be found in common use, such a camera being a very small pocket camera into one side of which is placed the said carrier. The carrier is formed of thin, stiff cardboard or pasteboard suitably reinforced by a minimum amount of thin sheet metal, and is cheaply constructed with a view to being discarded when the several exposed films have been removed therefrom for developing. The carrier has at one end, a sensitized strip of film wound on an ordinary spool or roll, the free and non-sensitized end of the film being stretched across the length of the carrier and attached to another, empty spool at the other end of the carrier, the latter having an exposure opening in its wall opposite this stretched portion towards which the sensitized face of the film strip is directed. When this film and carrier is placed in said camera and all the films have been exposed, by winding the second spool in the usual manner, the carrier containing the exposed films on said roll or spool is placed into the holder or box 22 with the roll adjacent to the inner end of the same, as clearly shown in Figure 1 of the drawing.

As illustrated in said figure, the carrier A has been inserted into the holder 22 with the roll of films B innermost and the free, non-sensitized end C, which is from two to three inches in length, threaded through the spout 28 and sufficiently projected to be engaged in the clip 21 of the winding drum 8, which is supported in elevated position above the upper end of the container 1, with the closure sleeve 14 frictionally held on the drum above the said clip. By lowering the drum to engage the nut 10, with the tapered upper end of the threaded post 5, and positioning the closure sleeve with the open, lower end of the slot 19 to receive the upper edge of the vertically disposed film B, the said sleeve may then be lowered to rest upon the annular bead 3 of the container and in surrounding relation to the open, upper end of the latter, the outstanding flanges 20, at either side and at the top of the slot 19 being then in flanking relation to the inner end of the spout 28 to effectually exclude all light at this point. By the application of the thumb and fingers of the operator to the crossed arms 13, the drum may be wound downwardly into the container, the threads on the post 5 being of such a pitch as to advance the drum at the proper rate for winding the film in a close, tight spiral coil thereon as illustrated in Figure 6 of the drawing. As the drum advances downwardly into the container, the lower end 9 thereof, which forms a housing for the nut 10 and prevents the same from striking the bottom 2 of the container, causes a displacement of the developing fluid D and forces the same up along the sides of the drum to completely submerge the film, the sensitized face of the latter being upon the outside of the spiral winding.

By reason of the close fitting relation of the parts comprising the joint between the film holder and the entrance slot through the closure sleeve, when the latter is in place on the container, as well as the tight joint between the sleeve and the container and the sleeve and the drum, all chance for the entrance of light is prevented, and the winding operation is proceeded with until the drum rests upon the bottom of the container, the felt packing ring of the closure sleeve permitting such turning while excluding the light.

The downward movement of the drum is guided by the felt ring as well as the tube 11 surrounding the post 5, and the drum is thus caused to travel longitudinally of the container and parallel to the side walls thereof, to provide ample space for the coils of the film and for sufficient quantity of the fluid to accomplish the purpose, and it will be seen that by this arrangement only a relatively small quantity of said fluid need be placed in the container and that the same is effectually prevented from leaking or spilling during the operation of the device.

For use in connection with this particular form of film carrier, the removable holder 22, is employed which, when removed from the container, greatly facilitates the threading of the free end of the film through the spout and into engagement with the clip 21, after which the nut may be engaged with the post 5 and the closure sleeve fitted in place and the turning movement proceeded with. When the developing process has been completed after allowing the film to be submerged the proper length of time, the sleeve 14 is removed from the upper end of the container to expose the upper end of the drum, when the carrier A is withdrawn from the holder 22, thus unwinding the remainder, or other non-sensitized end of the film which may then be readily held against the drum 8 at the upper portion of the latter, as illustrated in Figure 6, when by simply suspending the same, the container may be caused to gravitate and to unwind from its threaded connection with the drum, and the film may then be treated in a fixing bath in the usual manner which may be safely done in the open.

In Figures 7 to 11 inclusive there is illustrated the preferred form of the invention. In this form the tank or container 1 is substantially the same as in the first described form of the invention, except that the concave bottom 2 is provided with a central depression $2^a$, and the side wall is provided with an inwardly directed stop $1^a$ located adjacent to the bottom of the container and formed, as is the depression $2^a$, by pressing in the metal comprising the container and the drum 8, the said drum being, in all other respects, similar to that of the first form.

The closure sleeve 14 is provided with the packing ring 18 for surrounding the drum 8 at the top, and the sleeve is adapted to rest, when seated, upon the bead 3 of the container 1 in the same manner as in the first described form. The wall of the sleeve is cut away circumferentially for a considerable distance to provide an elongated entrance opening or slot $19^a$ for the film strip, as will be apparent by reference to Figure 13. Secured to the margins of this opening $19^a$ is an outstanding flange $20^a$ enlarged at one side to form a rounded extension $20^b$ and having its free edges tangentially arranged with relation to the cylindrical walls of the container, and defining a rectangular form as viewed from the front. The upper and lower flanges $20^a$ are provided with alined slots $30^a$ for the reception of the pintles 31 of the film spool 32, the said pintles being arranged somewhat off the perpendicular and at the axis of the rounded extension $20^b$, as clearly shown in Figures 8 and 13.

A closure cap $33^a$ having an enlarged, rounded end $33^b$ corresponding to the rounded extension $20^b$ and provided with a marginal flange $33^c$ around its open side is adapted to surround the flange $20^a$, and be frictionally held in place to exclude light after the spool has been placed in position and secured to the clip 21 of the drum 8.

The bottom 9 of the drum is concave to fit upon the bottom 2 of the container, and is provided with the tube 11 suitably secured to the bottom 9 and to the crossed arms 13 at the top, the said tube being provided at its lower end with a threaded portion $10^a$ conforming in shape and pitch to the threads of the post $5^a$ and adapted to receive the same.

The post $5^a$ is supported in upright position within the container by the radially disposed arms $5^b$ of a base or spider, concavely formed to conform to the bottoms 2 and 9 of the container and drum respectively, the lower end of the post being headed as at $5^c$ which rests within the depression $2^a$, when the parts are fully telescoped (Fig. 10).

The outer ends of the arms $5^b$ are bent upwardly as at $5^d$, and one of the same is adapted to abut against the stop $1^a$ and prevent the spider and the post from turning when the drum is being screwed into the container as in the first described form of the invention.

With the drum fully lowered into the container and the film strip B wound in the proper manner about the drum, as illustrated in Figure 9, it will be seen that the sleeve 14 together with the drum, the post 5ª and the spider 5ᵇ may be withdrawn from the container to inspect the condition of the developing film, without the necessity of unscrewing the drum from the post, and that the said parts may be quickly placed back in position again without any screwing action if it be found necessary, by reason of the undeveloped or unfinished condition of the film.

In Figure 12 there is illustrated another modified form of the invention, the drum 8ª in this case being provided throughout its length with a spiral bead or thread 8ᵇ rolled or formed of the metal of the drum by a well known process, and the upper end of the closure sleeve 14ª is reduced and provided with a corresponding bead or thread 14ᵇ to engage the drum and cause the latter to be projected into the container when the drum is turned as in the first described form of the invention. In this form the slot for the entrance of the strip of film is provided in the straight lower portion of the closure sleeve, and is surrounded by top, bottom and side walls 29 constituting a film roll holder, the top and bottom 29 being provided with longitudinal, alined slots 30 extending into the same for the ends of the pintle 31, which extend slightly beyond the ends of the roll or spool 32 having the film with the impressions thereon. A closure cap 33 for excluding the light is then placed over the open end of the film holder, after the free end of the film has been attached to the drum in the aforesaid manner, and the process of developing is proceeded with as before described. This form of film holder is adapted to receive a roll of films after they have been exposed, such roll being of the common form in general use principally by amateur photographers.

The close connection between the upper end of the closure sleeve 14ª and the drum 8ª, by reason of their threaded engagement with each other, is sufficient to form a light-proof joint and the felt packing is dispensed with, and it will be seen that the container 1 is exactly the same in construction as the container shown and described in the preceding figures, except that the bottoms of the container and drum are flat and the said drum 8ª is provided at its base with an annular bead 8ᶜ to prevent the film from touching the sides of the container during the downward movement of the drum.

In the three forms of the invention, the several threaded members are adapted to cause the progressive advance of the drum into the fluid container by a turning movement of the former at the proper rate of speed to produce the spiral winding of the film upon the drum, with the adjacent edges of the said film in close proximity to each other, and the proper quantity of fluid may be determined to reach up to a height, when the drum is at the bottom of the container, to submerge the sensitized portions of the film strip.

One of the principal features of the invention is the submerging of the drum within the tank solution, which rises at the same time so as to cover the surface of the film, the latter being laid evenly on the outer face of the drum without overlapping the same. So far as I am aware it is new to push down a drum with the film wound thereon into the tank or cylinder containing the solution which is thereby caused to rise in the tank so as to enclose the film on the outside of the drum.

Another feature of novelty is the provision of means for progressively winding the film on the drum and at the same time feeding the drum or cylinder into the tank containing the solution.

From the foregoing it will be seen that a simple, cheaply manufactured device has been provided, which may be employed to develop strips or rolls of films for photographic purposes, the developing process being safely carried on in the open without endangering the sensitive films by being exposed to the light, thus obviating the necessity for the use of a dark room, and that the same has been confined to a small compact device, easily carried from place to place without spilling any of the liquid contents thereof, the operations necessary to apply the film and to develop the same being easily and quickly learned.

What is claimed is:—

1. A device for developing films, comprising a fluid container, a drum smaller in diameter than the fluid container, means for supporting a film at one side with relation to the drum; means on the drum for engaging the end of the film, and connecting means with the drum whereby the latter is projected within the container by a progressive turning movement and by the same movement the film strip is wound spirally upon the drum.

2. A device for developing roll films, comprising a fluid container, a drum smaller in diameter than the fluid container, means for supporting a roll of films on the container at one side of the drum, means on the drum for engaging the end of the film strip, and connecting means with the drum whereby the latter is projected within the container by a progressive turning movement and by the same movement the film strip is wound spirally upon the drum.

3. A device for developing roll films, comprising a fluid container, a drum smaller in diameter but of greater length than the fluid container, means for supporting a roll of films at one side of the drum, means on the drum for engaging the end of the film strip, and connecting means with the drum whereby the latter is projected within the container by a progressive turning movement and by the same movement the film strip is wound spirally upon the drum, and a closure sleeve fitted to the end of the container around the drum.

4. A device for developing roll films, comprising a fluid container, a drum smaller in diameter than the container and adapted to fit partly within the latter, a removable sleeve adaped to fit on the container and around the drum, means for supporting a roll of films at one side of the device, means for connecting the end of the film strip to the outside of the drum, said sleeve being provided with an entrance slot for the passage of the film strip, and connecting means with the drum whereby a turning movement imparted to the drum causes the progressive movement of the drum into the container as well as the spiral winding of the film strip about the drum.

5. A device for developing roll films, comprising a fluid container, a drum smaller, in diameter but greater in length than the container and adapted to fit partly within the latter, a removable sleeve adapted to fit on the container and around the drum with a light-excluding fit, the end of the drum being accessible beyond the sleeve for turning, means for supporting a roll of films on the device at one side, means for connecting the end of the film strip to the outside of the drum, said sleeve being provided with an entrance slot for the passage of the film strip, and connecting means with the drum, whereby a turning movement imparted to the drum causes the progressive movement of the drum into the container as well as the spiral winding of the film strip about the drum.

6. A device for developing photographic films, comprising a container for the developing fluid, a drum on the outside of which the film is wound spirally, and means whereby the drum is projected into the container to displace the fluid and cause the same to rise around the drum and film to develop the latter, said means being actuated by the turning movement of the drum.

7. A device for developing photographic films, comprising a fluid container, a film-winding drum adapted to have a film strip wound spirally thereon, and means whereby the drum is projected longitudinally into the container to displace the fluid and cause the same to rise around the drum and at the same time the film strip is wound upon the drum.

8. A device for developing photographic films, comprising a fluid container, threaded means within the container, a winding drum adapted to have a film spirally wound about the same and having threaded means for engagement with the first-named threaded means to cause the drum to enter the container, upon being turned, and to submerge the film in the fluid.

9. A device for developing photographic films, comprising a container for holding a quantity of developing fluid, said container being open at its upper and closed at its bottom, and having threaded means therein, a closure sleeve mounted on the open end of the container and having an entrance slot for the film, a film holder communicating with the entrance slot and adapted to hold a roll of films, and a cylindrical winding drum of less diameter than the container, adapted to pass through the closure sleeve and having threaded engagement with the first mentioned threaded means to cause the drum to be advanced longitudinally into the container when the drum is turned.

10. A device for developing photographic films, comprising a container for holding a quantity of developing fluid, said container being open at its upper end and closed at its bottom, a threaded member within the container, a closure sleeve mounted on the open end of the container and provided with an entrance slot communicating with the interior of the container, a film holder communicating with the slot and adapted to carry a roll of films, a film-winding drum adapted to pass through the sleeve, means for preventing passage of light where traversing the sleeve, said drum being closed at its lower end and open and provided with turning means at its upper end, securing means for the free end of the film carried at the lower end of the drum, and threaded means provided on the drum for engagement with the threaded member within the container whereby, when the drum is turned, the same is carried into the container and the film is wound thereon and submerged in the displaced developing fluid.

11. A device for developing photographic films, comprising a cylindrical container open at its upper end, and having a threaded post extending upwardly from the bottom thereof longitudinally above the open top of the same, a closure sleeve adapted to fit over the open end of the container and having an entrance slot, said sleeve carrying a packing ring at the top, a cylindrical film-winding drum snugly fitting the felt ring and having a closed bottom provided with a threaded portion adapted to be engaged by the said post, a tube secured to the bottom of the drum in surrounding relation to the post and extending to the top of the drum, turning arms connecting the upper end of the tube to the upper end of the drum, a film clip secured to the lower end of the drum, and a film roll holder communicating with the said entrance slot to permit the passage and unwinding of the film therethrough when the drum is revolved to cause the same to enter the container and spirally wrap the film around said drum while submerged in the fluid within the container.

12. A device for developing photographic films, comprising a cylindrical container open at its upper end and having a threaded post rising from the bottom thereof and extending longitudinally above the open top of the same, a closure sleeve adapted to fit over the open end of the container and having an entrance slot, said sleeve carrying an inwardly directed felt packing ring, a cylindrical film-winding drum snugly fitting the felt ring and having a closed bottom provided with a central threaded portion adapted to be engaged with the said post, a tube secured to the bottom of the drum in surrounding relation to the post and extending to the top of the drum, a film clip secured to the lower end of the drum, and a film roll holder communicating with the said entrance slot to permit the passage and unwinding of the film therethrough when the drum is revolved to cause the same to enter the container and spirally wrap the film around said drum while submerged in the fluid within the container.

13. A device for developing photographic films, comprising a cylindrical container for the developing fluid, the said container being open at its upper end and closed at its lower end, a centrally located threaded post removably mounted within the container, a spider supporting the post and resting on the bottom of the container, a stop carried by the latter and adapted to be abutted by one of the legs of the spider to arrest its turning action and permit longitudinal withdrawal of the post and spider from the container, a film-winding drum adapted to be projected into the container and having threaded engagement with the post and removable therewith from the container, a closure sleeve mounted on the open end of the latter and surrounding the drum, said sleeve having an entrance opening and a holding device for a film strip.

14. A device for developing photographic films, comprising a cylindrical container for the developing fluid, the said container being open at its upper and closed at its lower end, a centrally located threaded post removably mounted within the container, a spider supporting the post and resting on the bottom of the container, a stop carried by the latter and adapted to be abutted by one of the legs of the spider to arrest its turning action and permit longitudinal withdrawal of the post and spider from the container, a film-winding drum adapted to be projected into the container and having threaded engagement with the post and removable therewith from the container.

15. A device for developing photographic films, comprising a container for the developing fluid, said container being closed at its bottom and open at its upper end, a threaded post supported on the bottom of the container and removably mounted therein, a drum having a threaded portion engaging the post, and a tube surrounding the latter.

16. A device for developing photographic films, comprising a container for the developing fluid, a spider resting on the bottom of the container and having a threaded post projecting upwardly from the same, means for preventing the turning movement of the spider and the post, a drum revolubly mounted on the post and having a threaded portion engaging the threads of the latter, and a tube rising from the drum and surrounding the post.

17. A device for developing photographic films, comprising a container for the developing fluid, a drum within the container and of greater length than the same, a sleeve mounted on the container and having a light excluding connection with the drum, and means mounted in part on the container and in part on the drum, whereby the turning of the drum causes the progressive movement of the drum within the container.

18. A device for developing photographic films, comprising a container for the developing fluid, a drum adapted to fit within the container, and threaded means supported in part on the drum and in part on the container, whereby the turning movement of the drum causes the latter to be projected within the container to displace the developing fluid and cause it to rise within the container.

19. A device for developing photographic films, comprising a container for the developing fluid, a drum adapted to fit within the container, threaded means supported within the container and held from rotary movement, and threaded means provided on the drum to engage the first-mentioned threaded means, whereby the turning movement of the drum causes the latter to be projected within the container, said threaded means being removable from the container along with the drum when the latter is withdrawn.

20. In a device for developing photographic films, a container for the developing fluid, a drum to receive the film on its exterior face, and means operated by the turning movement of the drum to cause the progressive projection of the drum within the container and at the same time cause the fluid to rise in the container about the drum and in contact with the film.

21. In a device for developing photographic films, the combination of a fluid container adapted to receive a developing solution, a drum, and means for projecting the drum into the container to displace the fluid and cause the same to rise around the drum and for simultaneously winding the film spirally around the outside of the drum, whereby the same will be immersed in the developing solution.

In testimony that I claim the foregoing as my own, I have hereto affixed my signature.

GEORGE W. HENRY.